(12) United States Patent
Su et al.

(10) Patent No.: US 9,380,643 B2
(45) Date of Patent: Jun. 28, 2016

(54) UPLINK BEHAVIOR FOR A DEVICE USING MULTIPLE RADIO ACCESS TECHNOLOGIES

(71) Applicant: Apple Inc., Cupertino, CA (US)

(72) Inventors: Li Su, San Jose, CA (US); Yingjie Zhao, Pleasanton, CA (US); Si Li, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 24 days.

(21) Appl. No.: 14/180,520

(22) Filed: Feb. 14, 2014

(65) Prior Publication Data

US 2015/0237675 A1    Aug. 20, 2015

(51) Int. Cl.
*H04M 1/00* (2006.01)
*H04W 88/06* (2009.01)
*H04W 72/04* (2009.01)

(52) U.S. Cl.
CPC .......... *H04W 88/06* (2013.01); *H04W 72/0413* (2013.01)

(58) Field of Classification Search
CPC ..... H04W 72/04; H04W 88/02; H04W 40/00; H04W 24/00; H04W 48/16
USPC ...................................................... 455/553.1
See application file for complete search history.

(56) References Cited

U.S. PATENT DOCUMENTS

| | | | |
|---|---|---|---|
| 2010/0034158 A1 | 2/2010 | Meylan | |
| 2011/0205928 A1 | 8/2011 | Pelletier et al. | |
| 2012/0294173 A1* | 11/2012 | Su | H04W 24/10 370/252 |
| 2013/0201850 A1* | 8/2013 | Swaminathan | H04W 88/06 370/252 |
| 2013/0235768 A1 | 9/2013 | Earnshaw et al. | |

OTHER PUBLICATIONS

Edited by Harri Holma and Antti Toskala, LTE for UMTS: Evolution to LTE-Advanced, 2nd Edition, 2011, John Wiley & Sons, Ltd.*

* cited by examiner

*Primary Examiner* — Wesley Kim
*Assistant Examiner* — Raj Chakraborty
(74) *Attorney, Agent, or Firm* — Meyertons Hood Kivlin Kowert & Goetzel, P.C.; Jeffrey C. Hood; Joel L. Stevens

(57) ABSTRACT

Improving uplink behavior for a user equipment (UE) having a radio capable of communicating using at least a first radio access technology (RAT) and a second RAT. The UE may be configured to use the radio for both the first RAT and the second RAT. The UE may receive a first uplink grant corresponding to the first RAT. Prior to completing a process corresponding to the first uplink grant for the first RAT, the UE may communicate using the second RAT. After communicating using the second RAT, the UE may transmit an uplink request for the first RAT instead of completing the process corresponding to the first uplink grant.

20 Claims, 7 Drawing Sheets

UPLINK BEHAVIOR FOR A DEVICE USING MULTIPLE RADIO ACCESS TECHNOLOGIES

FIELD

The present application relates to the field of wireless communication, and more particularly to a system and method for improving uplink behavior for a device using multiple radio access technologies (RATs).

DESCRIPTION OF THE RELATED ART

Wireless communication systems are rapidly growing in usage. Further, wireless communication technology has evolved from voice-only communications to also include the transmission of data, such as Internet and multimedia content. As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed.

Additionally, there exist numerous different wireless communication technologies and standards. Some examples of wireless communication standards include GSM, UMTS, LTE, CDMA2000 (e.g., 1xRTT, 1xEV-DO), IEEE 802.11 (WLAN or Wi-Fi), IEEE 802.16 (WiMAX), Bluetooth, and others. Some of these standards may serve complementary functions while others may typically be considered competitors attempting to fulfill similar needs amongst consumers.

In order to provide continuity between generations of wireless communication technologies, in order to provide complementary functionality, and/or for other reasons, it may often be desirable to provide the ability for a device to communicate using multiple wireless technologies or standards. In some cases, this may be accomplished by providing separate functional blocks for each wireless communication technology or standard in a device. However, this may incur additional costs associated with the device due to more (and in some cases duplicate) components being required, and may introduce inefficiencies in device operation (e.g., greater power requirements due to multiple radios, interference between radios adversely affecting each other). This may also adversely affect the form factor of the device, especially if the device is a mobile device for which a smaller (e.g., slimmer, lighter) form factor may be desirable.

An alternative might include a device which uses a single functional block (e.g., a single radio) to implement multiple wireless communication technologies. However, sharing a single radio between multiple wireless technologies has its own set of challenges. For example, if only one wireless technology can use the radio at a time, there may occasionally (or frequently) be conflicts between the wireless technologies for use of the radio. Accordingly, improvements in wireless communications and devices performing wireless communications would be desirable.

SUMMARY

As noted above, a device which uses a single functional block (e.g., a single radio) to implement multiple wireless communication technologies may have significant advantages relative to a device which uses separate functional blocks (e.g., separate radios) to implement different wireless communication technologies. Such a device could potentially have a lower manufacturing cost (e.g., due to fewer required components and/or simpler overall architecture) and more efficient operation (e.g., due to lower power requirements for the single radio). Additionally, such a single radio design may readily allow for a more desirable form factor (e.g., slimmer, lighter) of the device itself. However, in order to provide a single radio which effectively implements multiple wireless technologies, sophisticated control algorithms may be necessary.

The device may receive a first uplink grant for a first radio access technology (RAT). However, prior to completing a process corresponding to the first uplink grant for the first RAT, the device may switch from communicating using the first RAT to communicate using a second RAT, e.g., using the same radio. As a result, the device may be unable to complete the process corresponding to the first uplink grant in the expected or allocated time. Accordingly, after switching back to the first RAT, the device may be configured to transmit an uplink request for the first RAT instead of attempting to complete the process corresponding to the first uplink grant.

For example, after receiving the first uplink grant, the device may switch to the second RAT without transmitting first uplink data. Accordingly, after receiving a new uplink grant in response to the uplink request, the device may send the uplink data based on the new uplink grant instead of transmitting data according to the first uplink grant.

As another example, after receiving the first uplink grant, the device may transmit the first uplink data, but may switch to the second RAT prior to receiving an acknowledgement message (ACK) or negative acknowledgement (NACK) corresponding to the first uplink data. As a result, the ACK or NACK may have been transmitted to the device while it communicates using the second RAT. When the device switches back to the first RAT, it may assume that the missed message was an ACK instead of the standard procedure of assuming the missed message was a NACK. Additionally, after receiving a new uplink grant in response to the uplink request, the device may transmit either the first uplink data or further data, as desired. For example, the device may re-transmit the first uplink data if it receives a message from the network indicating that the first uplink data was not received. Alternatively, it may simply transmit new uplink data.

BRIEF DESCRIPTION OF THE DRAWINGS

A better understanding of the present subject matter can be obtained when the following detailed description of the preferred embodiment is considered in conjunction with the following drawings, in which.

Figure 1:
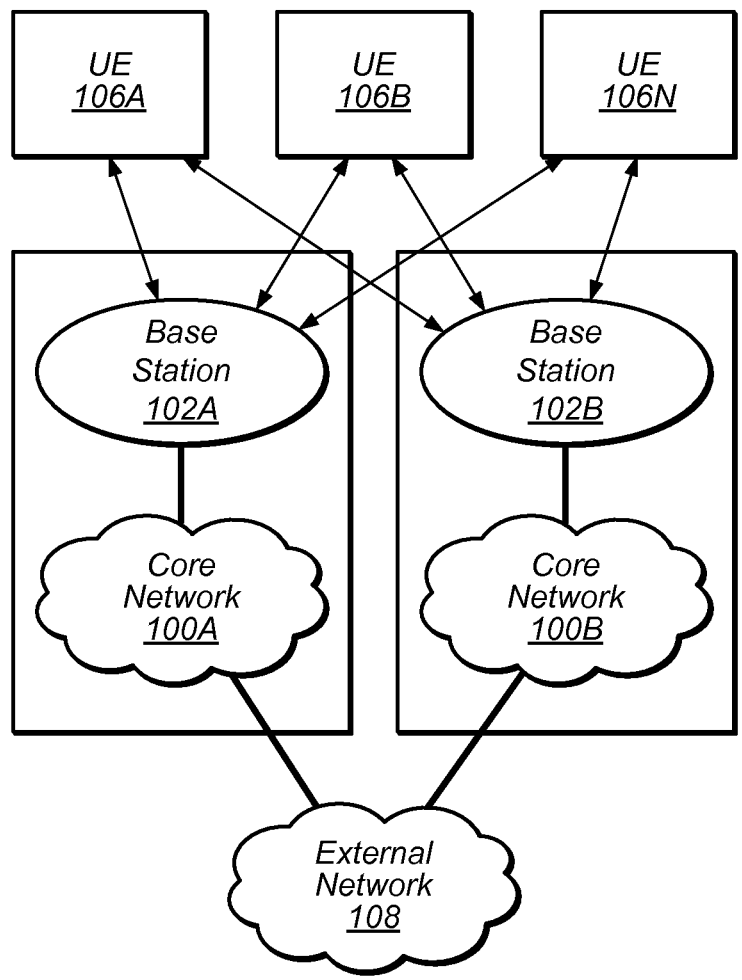
FIG. 1 illustrates an exemplary wireless communication system.

While the features described herein susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
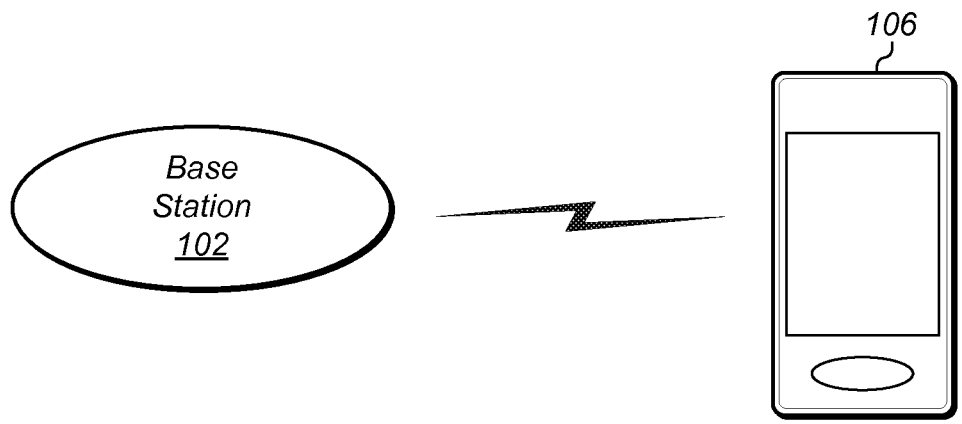
FIG. 2 illustrates a base station in communication with a user equipment device.
Figure 3:
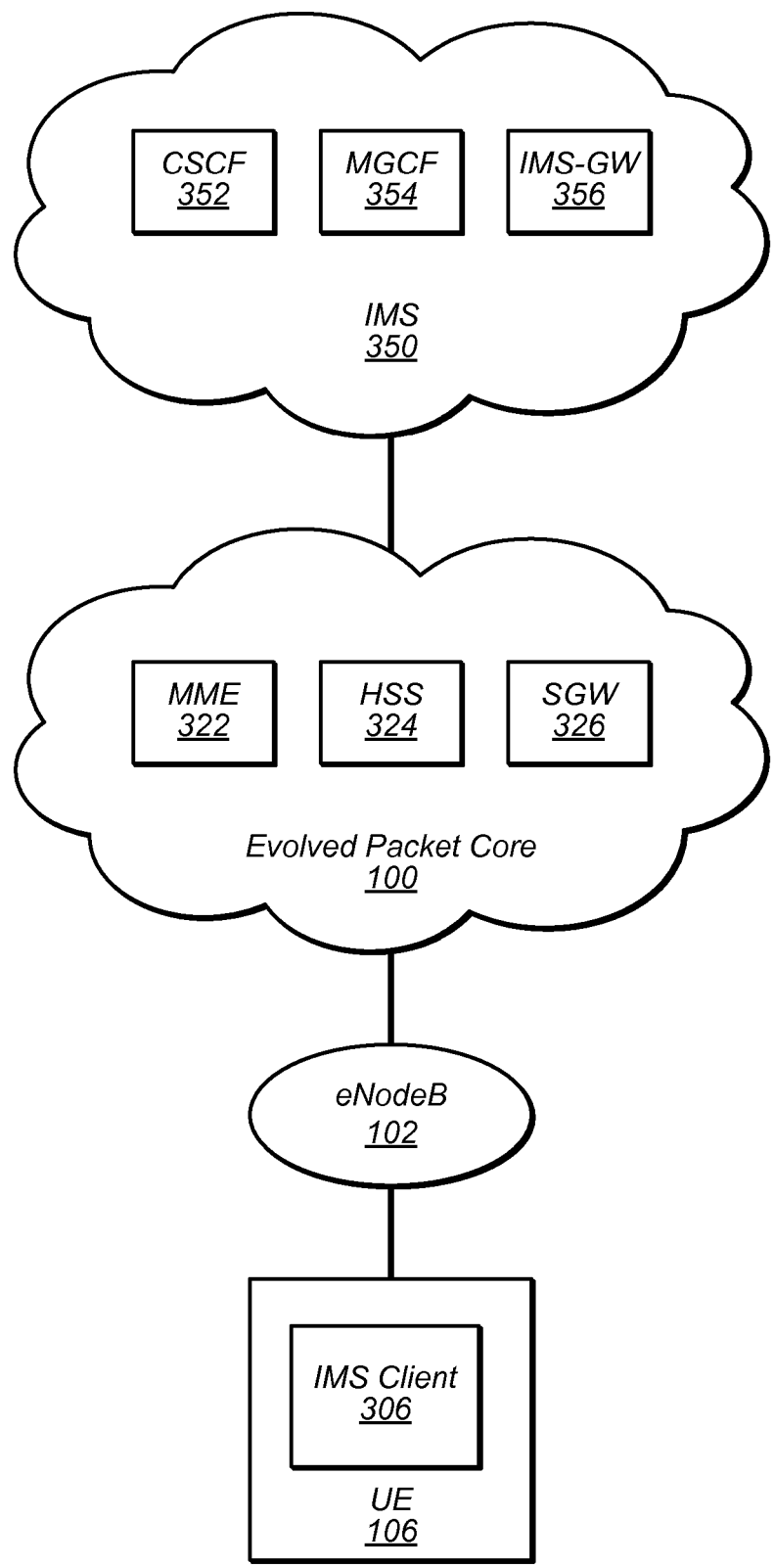
FIG. 3 illustrates an exemplary wireless communication system which may be used for voice over IP embodiments.

FIGS. 1-3—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes base stations 102A and 102B which communicate over a transmission medium with one or more user devices 106A through 106N. Each of the user devices may be referred to herein as a "user equipment" (UE). Thus, the user devices are referred to as UEs or UE devices.

The base stations 102 may be base transceiver stations (BTS) or cell sites, and may include hardware that enables wireless communication with the user devices 106A through 106N. Each base station 102 may also be equipped to communicate with a core network 100 (Base station 102A may be coupled to core network 100A, while base station 102B may be coupled to core network 100B), which may be a core network of a cellular service provider. Each core network 100 may also be coupled to one or more external networks (such as external network 108), which may include the Internet, a Public Switched Telephone Network (PSTN), and/or any other network. Thus, the base stations 102 may facilitate communication between the user devices 106 and/or between the user devices 106 and the networks 100A, 100B, and 108.

The base stations 102 and the user devices 106 may be configured to communicate over the transmission medium using any of various radio access technologies ("RATs", also referred to as wireless communication technologies) or telecommunication standards such as GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B operate according to a second (e.g., different) RAT (e.g., CDMA 2000 or GSM, among other possibilities, e.g., legacy or circuit switched technologies). The two networks may be controlled by the same network operator (e.g., cellular service provider or "carrier"), or by different network operators, as desired. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the exemplary network configuration shown in FIG. 1, other network configurations implementing multiple cellular communication technologies are also possible. As one example, base stations 102A and 102B might operate according to different cellular communication technologies but couple to the same core network. As another example, multi-mode base stations capable of simultaneously supporting different cellular communication technologies (e.g., LTE and CDMA2000 1xRTT, LTE and GSM, and/or any other combination of cellular communication technologies) might be coupled to a core network that also supports the different cellular communication technologies. In one embodiment, the UE 106 may be configured to use a first RAT that is a packet-switched technology (e.g., LTE) and a second RAT that is a circuit-switched technology (e.g., GSM or 1xRTT).

A UE 106 may be capable of communicating using multiple wireless communication standards, such as 3GPP, 3GPP2, or any desired standards. The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of RATs or wireless communication standards (including more than two RATs or wireless communication standards) are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more cellular communication standards.

FIG. 2 illustrates user equipment 106 (e.g., one of the devices 106A through 106N) in communication with a base station 102. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. The UE 106 may also or alternatively include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, LTE, LTE-A, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1xRTT (or LTE or GSM), and separate radios for communicating using each of Wi-Fi and Bluetooth. Other configurations are also possible.

FIG. 3 illustrates an exemplary, simplified portion of a wireless communication system that may be particularly useful for implementing voice over IP communication, such as voice over LTE (VoLTE) in an LTE network. As shown, the UE 106 may include an IP multimedia subsystem (IMS) client 306, e.g., which may be implemented in various manners, using hardware and/or software. For example, in one embodiment, software and/or hardware may implement an IMS stack that may provide desired IMS functionalities, e.g., including registration, AKA authentication with IPSec support, session setup and resource reservations, etc.

The UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices known to those skilled in the art as well.

The EPC 100 may be in communication with the IMS 350. The IMS 350 may include call session control function (CSCF) 352, which may itself include a proxy CSCF (P-CSCF), interrogating CSCF (I-CSCF), and serving CSCF (S-CSCF), as desired. The IMS 350 may also include media gateway controller function (MGCF) 354 and IMS management gateway (IMS-MGW) 356. Similar to the EPC 100, the IMS 350 may include various other devices known to those skilled in the art as well.

Thus, the system of FIG. 3 illustrates an exemplary portion of the data pathway used for voice over IP communication, e.g., VoLTE.

Figure 4:
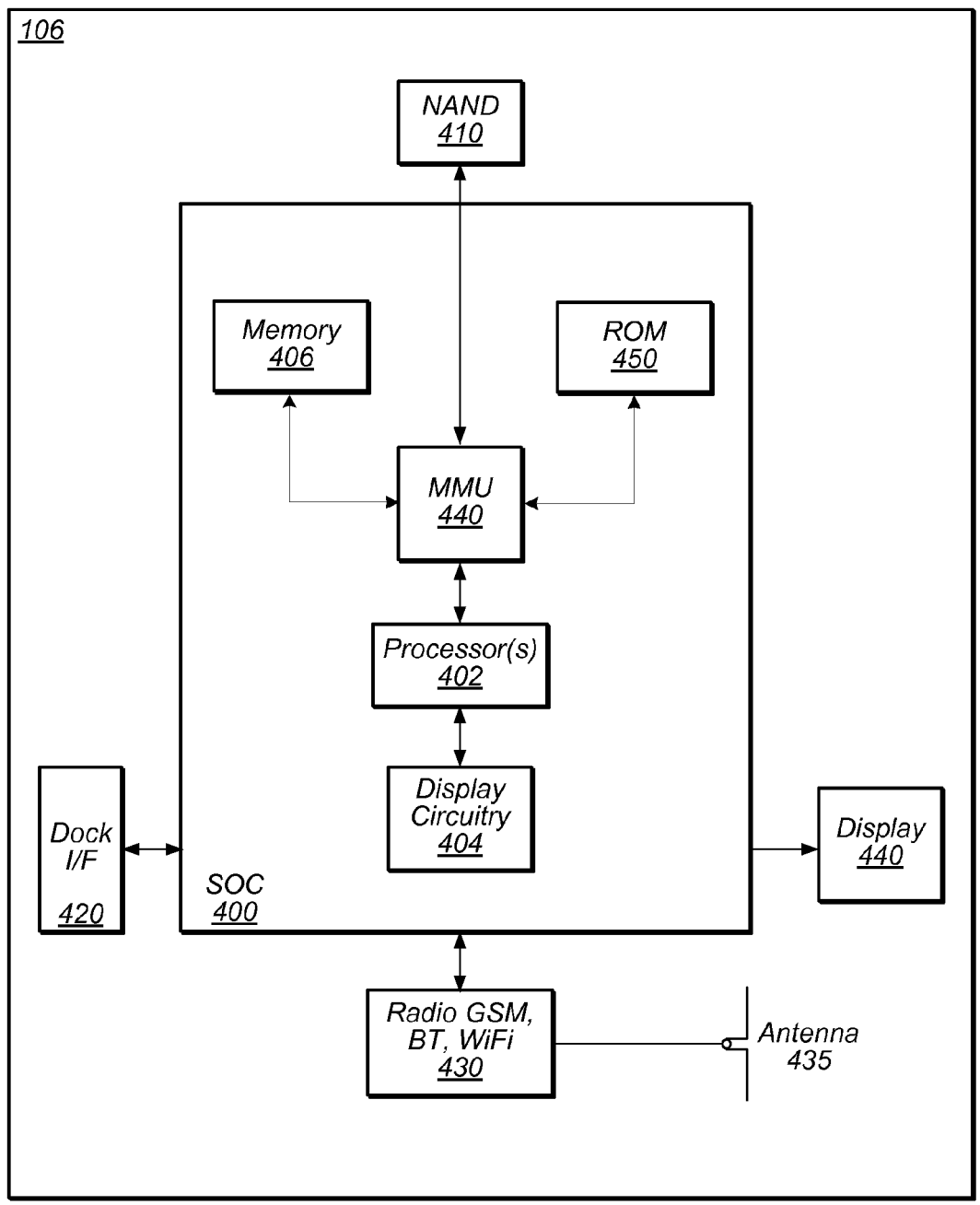
FIG. 4 is an example block diagram of a user equipment device.

FIG. 4—Exemplary Block Diagram of a UE

FIG. 4 illustrates an exemplary block diagram of a UE 106. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430 (also referred to as a "radio"), connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for LTE, CDMA2000, Bluetooth, WiFi, etc.).

As noted above, the UE 106 may be configured to communicate wirelessly using multiple wireless communication technologies. As further noted above, in such instances, the wireless communication circuitry (radio(s)) 430 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna 435 to perform the wireless communication.

As described herein, the UE 106 may include hardware and software components for implementing features for communicating using one or more wireless communication technologies, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
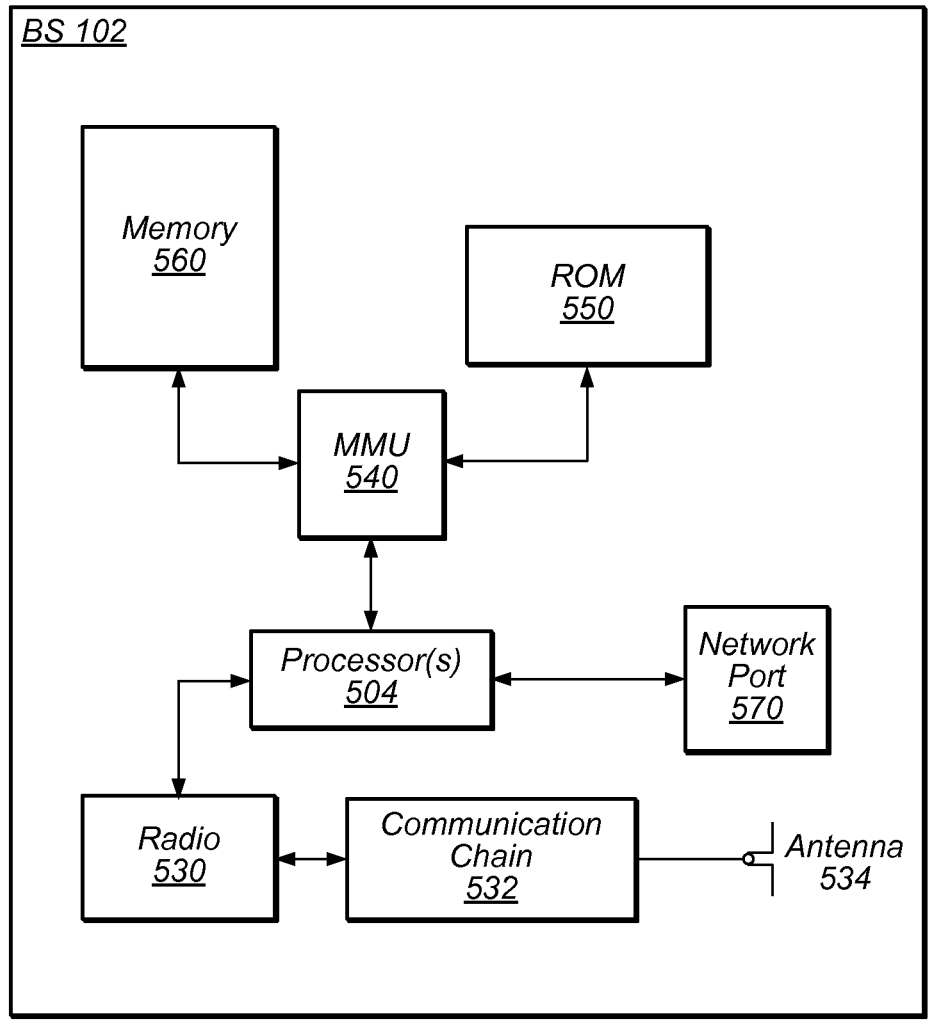
FIG. 5 is an example block diagram of a base station.

FIG. 5—Base Station

FIG. 5 illustrates an exemplary block diagram of a base station 102. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various wireless communication technologies, including, but not limited to, LTE, GSM, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 6:
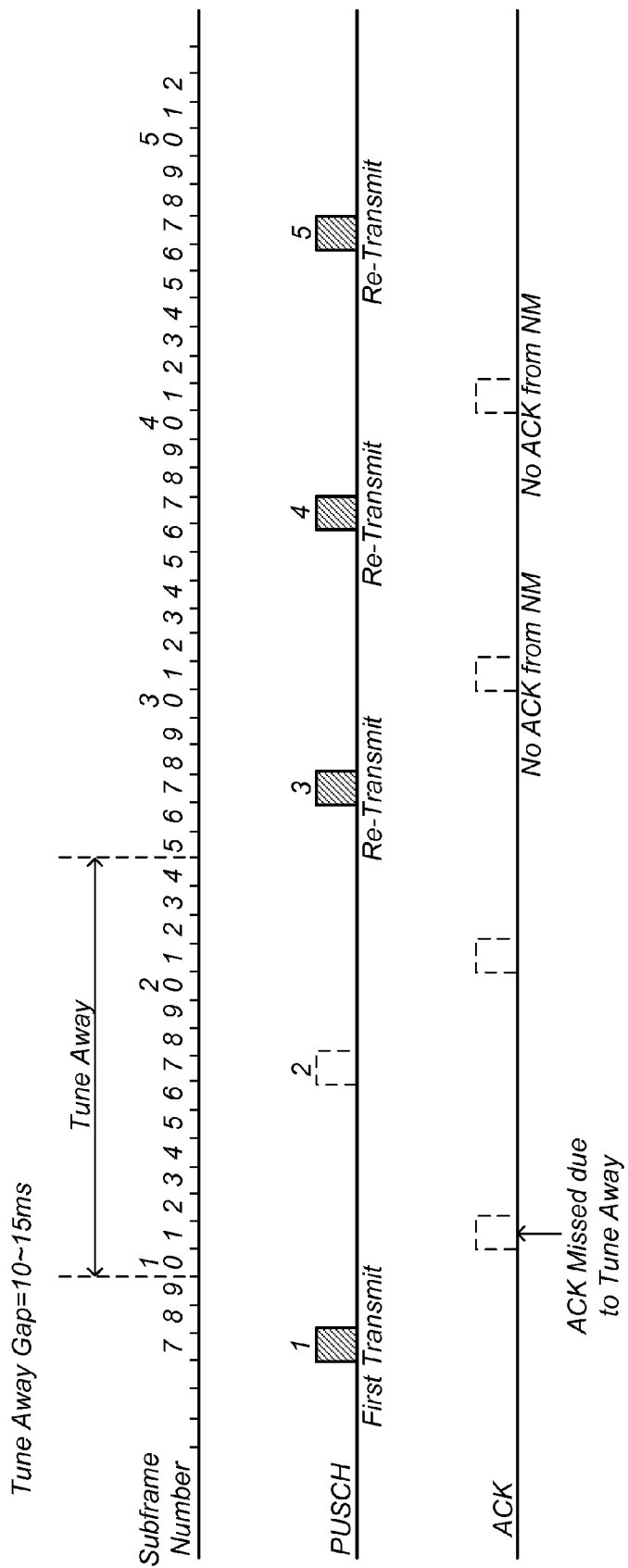
FIG. 6 is a timing diagram illustrating an exemplary situation where embodiments described herein may be applicable.

FIG. 6—Exemplary Timing Diagram

FIG. 6 is a timing diagram illustrating an exemplary situation where various embodiments described herein may be applied. In particular, the timing diagram of FIG. 6 may correspond to a situation where a UE may be communicating with a first RAT (e.g., LTE) and may have received an uplink grant to perform a first transmission, shown as item 1 in the PUSCH (physical uplink shared channel). As shown, the UE may tune away to a second RAT (e.g., GSM, among others) from subframe 1-0 to subframe 2-4. During this time, the network of the first RAT may transmit an ACK for the first transmission; however, because the UE is tuned away, it may not receive the ACK, e.g., transmitted on the PHICH (physical hybrid-ARQ indicator channel). Note that the UE may have expected to receive an ACK or NACK during that time period, e.g., based on already known relationships between transmissions and acknowledgements. Additionally, as shown, the UE may not tune back in time to transmit on the next allocated re-transmission slot or to receive the corresponding ACK or NACK for that retransmission.

The default behavior for the UE (e.g., according to TS36.321 5.4.2, 5.4.1, among others) may be to assume that the missed message was a NACK and to re-transmit the data of the first transmission, e.g., using non-adaptive retransmission, as shown in 3, 4, and 5 of the PUSCH channel. However, because the network actually received the data and transmitted an ACK, it may ignore the retransmissions and not respond to the UE with a subsequent ACK or NACK, as shown in FIG. 6.

In a second scenario, not shown in FIG. 6, the UE may tune away from the first RAT to the second RAT prior to transmitting the first transmission, unlike the first scenario above. The default behavior for the UE may be to transmit according to the received grant after tuning back from the second RAT to the first RAT, e.g., using non-adaptive retransmission. TS 36.321 5.4.1 relates to this scenario.

For both of these scenarios, the network may reassign the resource of the PUSCH to another UE before the UE tunes back to the first RAT. In this case, the default retransmissions by the UE may cause interference on the network, which is undesirable. Alternatively, the network may transmit a message indicating a new resource block (RB) and modulation and coding scheme (MCS) for the UE (e.g., for adaptive retransmission); however, if the UE misses this message while tuned to the second RAT, it may default to perform non-adaptive retransmission, using the previous RB and MCS, which may result in the network failing to decode the retransmission, which is also undesirable.

Embodiments described herein may address these issues by performing one or more of:

1) The UE not interpreting a missed acknowledgement message as a NACK;

2) The UE avoiding performing non-adaptive retransmission, e.g., within these scenarios; and/or 3) The UE transmitting a request (e.g., a scheduling request (SR)) to request the PUSCH resource again, and then transmit according to the new PUSCH grant rather than the initial PUSCH grant.

Additionally, or alternatively, and with particular relevance to the first scenario, the UE may assume an ACK message was received and buffer the transmitted data in an automatic repeat request (ARQ) buffer (e.g., within a hybrid ARQ (HARQ) buffer). The UE may be configured to only re-transmit when there is a grant from the network. In one embodiment, the data may be kept in the buffer and removed after a number (T) of subframes, e.g., which may be defined according to the following formula:

$$T = \text{maximum HARQ re-transmit threshold} * \text{HARQ delay (e.g., 10 subframes)}$$

In some embodiments, the UE may only retransmit data from the first transmission if the network requests it, e.g., using higher layer signaling. This request from the network may occur when the missed message was a NACK instead of the assumed ACK. Further details are provided in the flow chart of FIG. 7, described below.

Figure 7:
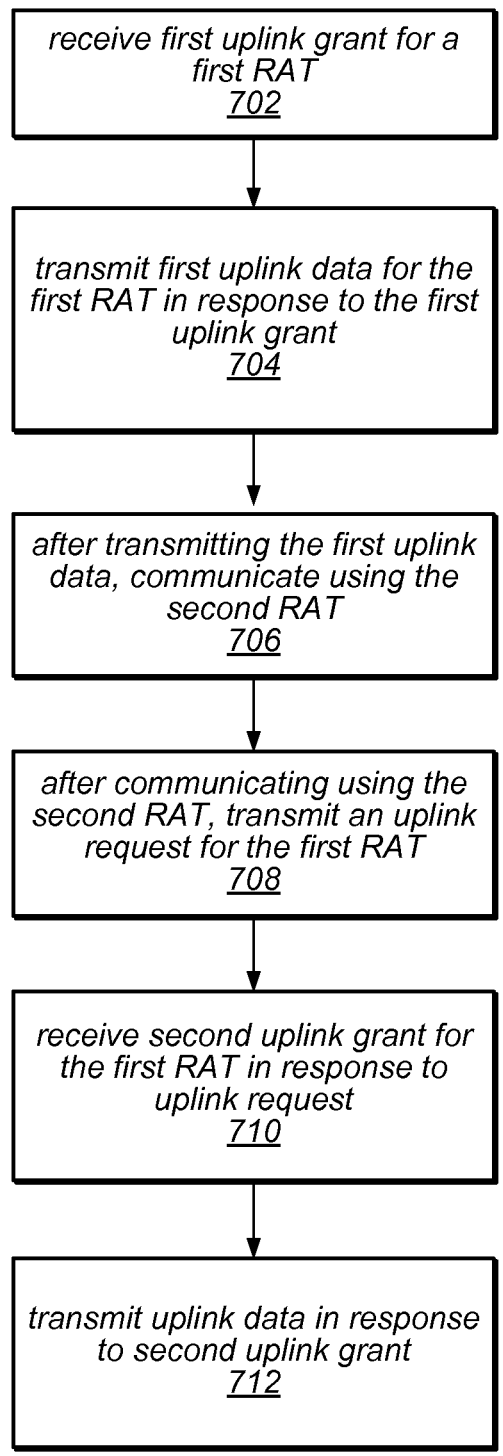
FIGS. 7 and 8 are flowchart diagrams illustrating exemplary methods for improving uplink behavior for a device communicating using multiple RATs.

FIG. 7—Improved Uplink Behavior for a Device Using Multiple RATs

FIG. 7 is a flowchart diagram illustrating an exemplary method for improving uplink behavior for a device using multiple RATs. The method may be implemented by a wireless UE device (such as UE 106), which may be configured to communicate using multiple RATs. The method shown in FIG. 7 may be used in conjunction with any of the systems or devices shown in the above Figures, among other devices. Similar to discussions above, the method of FIG. 7 may be particularly applicable to a UE which uses a single radio for a first RAT (e.g., LTE) and a second RAT (e.g., GSM, among other possibilities, such as circuit switched or legacy technologies). In various embodiments, some of the method elements shown may be performed concurrently, in a different order than shown, or may be omitted. Note also that additional method elements may also be performed as desired. The method may be performed as follows.

In 702, the UE may receive a first uplink grant for the first RAT.

In 704, the UE may transmit first uplink data in response to the first uplink grant.

In 706, after transmitting the first uplink data, the UE may communicate with the second RAT during a first time period, e.g., using the same radio that was used for the first RAT. As a result, the UE may be unable to receive any transmissions from the network corresponding to the first RAT within that first time period. For example, the network of the first RAT may transmit an acknowledgement message (ACK) or a negative acknowledgement message (NACK) corresponding to the first uplink data. As noted above, the UE may have expected to receive this message in the first time period, e.g., based on known acknowledgement behavior of the base station. Accordingly, the UE may not receive the ACK or NACK, e.g., since it is using the single radio to communicate using the second RAT instead of the first RAT.

Correspondingly, when the UE switches back from communicating using the second RAT to communicating using the first RAT, the UE may not be aware of whether the first uplink data was properly received by the network of the first RAT. As mentioned earlier, the default behavior may be to assume a NACK was transmitted. However, in the event that an ACK was transmitted, the default behavior of retransmitting using non-adaptive retransmission can result in issues for the network, e.g., interference, as discussed above. Accordingly, instead of assuming a NACK was transmitted and performing non-adaptive retransmission, the UE may instead assume that the uplink data was successfully received and that the missed message was an ACK.

In 708, the UE may transmit a new uplink request for the first RAT, and in 710, the UE may receive a second uplink grant in response to the new uplink response. This second uplink grant (or perhaps a later uplink grant) may be used to transmit new uplink data and/or retransmit the first uplink data, in the event that the first uplink data was not properly received (e.g., in the event that the missed message was a NACK). In one embodiment, the network may transmit a message indicating that the first uplink data was not received, and in response, the UE may retransmit the first uplink data in response to the second uplink grant. This message may be a higher layer message, as opposed to the ACK or NACK message discussed above. Alternatively, the UE may simply transmit new uplink data after receiving the second uplink grant, e.g., in the event that the first uplink data was properly received by the network.

Figure 8:
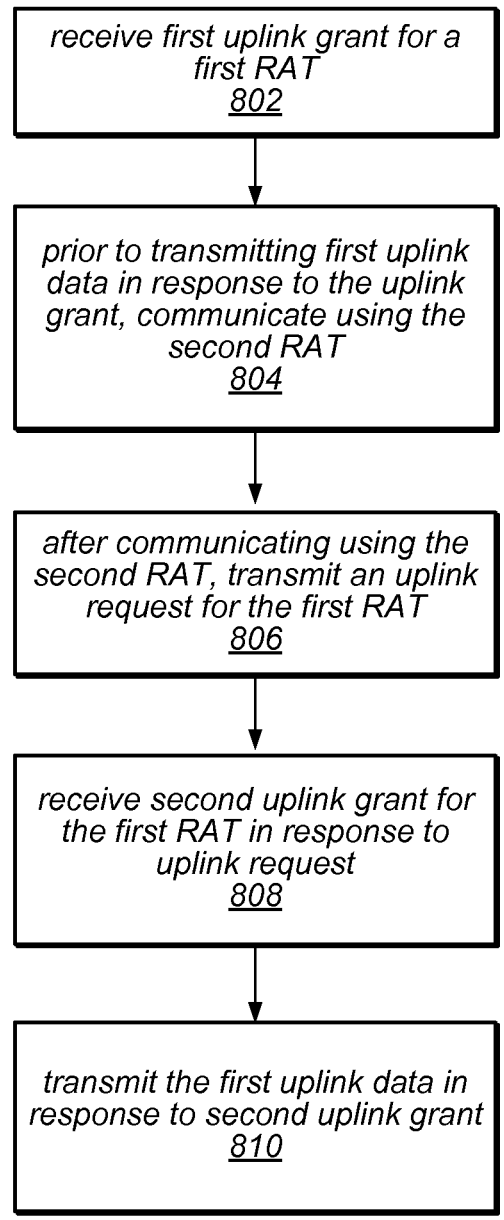

FIG. 8—Improved Uplink Behavior for a Device Using Multiple RATs

FIG. 8 is a flowchart diagram illustrating an exemplary method for improving uplink behavior for a device using multiple RATs. The method may be implemented by a wireless UE device (such as UE 106), which may be configured to communicate using multiple RATs. The method shown in FIG. 8 may be used in conjunction with any of the systems or devices shown in the above Figures, among other devices. For example, the method of FIGS. 7 and 8 may be both implemented by the UE during the course of communication sessions using the first and second RATs. Similar to discussions above, the method of FIG. 8 may be particularly applicable to a UE which uses a single radio for a first RAT (e.g., LTE) and a second RAT (e.g., GSM, among other possibilities, such as circuit switched or legacy technologies). In various embodiments, some of the method elements shown may be performed concurrently, in a different order than shown, or may be omitted. Note also that additional method elements may also be performed as desired. The method may be performed as follows.

In 802, the UE may receive a first uplink grant for the first RAT.

In 804, prior to transmitting first uplink data in response to the first uplink grant, the UE may communicate with the second RAT, e.g., using the same radio that was used for the first RAT. As a result, the UE may be unable to transmit the first uplink data at the desired or scheduled time, based on the first uplink grant.

In 806, the UE may switch from communicating using the second RAT to communicating using the first RAT. However, instead of transmitting according to the first uplink grant, e.g., using a non-adaptive retransmission, the UE may instead transmit an uplink request for a new uplink grant. By requesting a new uplink grant instead of transmitting according to the first uplink grant, the UE may avoid potential network congestion, e.g., where the network has reassigned the resource to another UE or has modified the RB and/or MCS assigned to the UE (e.g., where the UE has missed the message updating the RB and/or MCS).

In 808, the UE may receive a second uplink grant in response to the uplink request of 806.

In 810, the UE may transmit the first uplink data in response to and according to the second uplink grant.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A user equipment (UE), the UE comprising:
a radio coupled to one or more antennas and configured for wireless communication, wherein the radio is configured to communicate using at least a first radio access technology (RAT) and a second RAT, wherein the UE is configured to use the radio for both the first RAT and the second RAT; and
a processing element coupled to the radio;
wherein the radio and the processing element are configured to:
receive a first uplink grant corresponding to the first RAT;
transmit first uplink data for the first RAT in response to the first uplink grant;
after transmitting the first uplink data, communicate using the second RAT for a first time period, wherein during the first time period a first message of the first RAT is expected, wherein the first message is an acknowledgement message or a negative acknowledgement message responsive to the first uplink data, and wherein the radio does not receive the first message;
after said communicating using the second RAT and in response to not receiving the first message, transmit an uplink scheduling request to receive a new uplink grant to transmit the first uplink data for the first RAT instead of a retransmission of the first uplink data.

2. The UE of claim 1, wherein the first message comprises an acknowledgement message responsive to the first uplink data.

3. The UE of claim 1, wherein transmitting the uplink request is performed instead of assuming the first message was a negative acknowledgement message.

4. The UE of claim 1, wherein transmitting the uplink request is performed instead of performing non-adaptive retransmission of the first uplink data.

5. The UE of claim 1, wherein the UE is further configured to retransmit the first uplink data based on receiving a second uplink grant in response to transmitting the uplink scheduling request.

6. The UE of claim 5, wherein retransmitting the first uplink data is performed in response to receiving a message indicating the first uplink data was not received.

7. The UE of claim 1, wherein the first RAT comprises long term evolution (LTE) and wherein the second RAT comprises a circuit switched technology.

8. The UE of claim 1, wherein the second RAT comprises global system for mobile communications (GSM).

9. The UE of claim 1, wherein the processing element and the radio are further configured to:
receive a second uplink grant corresponding to the first RAT;
prior to transmitting second uplink data in response to the second uplink grant, communicate using the second RAT;

after communicating using the second RAT, transmit an additional uplink scheduling request for the first RAT instead of transmitting the second uplink data according to the second uplink grant.

10. The UE of claim 1, wherein the processing element and the radio are further configured to:
buffer the first uplink data in an automatic repeat request (ARQ) buffer; and
discard the first uplink data after reaching a maximum re-transmit threshold.

11. A method for operating a user equipment (UE) having a radio capable of communicating using at least a first radio access technology (RAT) and a second RAT, the method comprising:
at the UE:
receiving a first uplink grant corresponding to the first RAT using the radio, wherein the UE is configured to use the radio for both the first RAT and the second RAT;
prior to transmitting first uplink data in response to the first uplink grant, communicating using the second RAT using the radio;
after said communicating using the second RAT and in response to communicating using the second RAT prior to transmitting the first uplink data in response to the first uplink grant, transmitting an uplink scheduling request for the first RAT to receive a new uplink grant to transmit the first uplink data instead of transmitting the first uplink data according to the first uplink grant.

12. The method of claim 11, further comprising, at the UE:
receiving the new uplink grant for the first RAT; and
transmitting the first uplink data in response and according to the second uplink grant.

13. The method of claim 11, further comprising, at the UE:
receiving a second uplink grant corresponding to the first RAT;
transmitting second uplink data for the first RAT in response to the second uplink grant;
after transmitting the second uplink data, communicating using the second RAT, wherein during communicating using the second RAT, the UE does not receive a transmitted message of the first RAT corresponding to the second uplink data;
after said communicating using the second RAT, transmitting a second uplink request for the first RAT instead of a transmission related to the transmitted message.

14. The method of claim 11, wherein the UE is not configured to perform non-adaptive retransmission based on the first uplink grant.

15. The method of claim 11, wherein the first RAT comprises long term evolution (LTE) and wherein the second RAT comprises global system for mobile communications (GSM).

16. A non-transitory, computer accessible memory medium storing program instructions for a user equipment (UE) having a radio capable of communicating using at least a first RAT and a second RAT, wherein the program instructions are executable by a processor of the UE to:
receive a first uplink grant for the first RAT, wherein the UE is configured to use the radio for both the first RAT and the second RAT;
prior to completing a process corresponding to the first uplink grant for the first RAT, communicate using the second RAT;
after communicating using the second RAT and in response to communicating using the second RAT prior to completing the process corresponding to the first uplink grant for the first RAT, transmit an uplink scheduling request to receive a new uplink grant to transmit the first uplink data for the first RAT instead of completing the process corresponding to the first uplink grant.

17. The non-transitory, computer accessible memory medium of claim 16, wherein the program instructions are further executable to:
transmit first uplink data for the first RAT in response to the first uplink grant, wherein during communicating using the second RAT, the UE does not receive a transmitted first message of the first RAT corresponding to the first uplink data, and wherein transmitting the uplink scheduling request is performed instead of a transmission related to the first message.

18. The non-transitory, computer accessible memory medium of claim 16, wherein the UE did not transmit first uplink data corresponding to the first uplink grant prior to communicating using the second RAT, wherein transmitting the uplink scheduling request is performed instead of transmitting the first uplink data according to the first uplink grant.

19. The non-transitory, computer accessible memory medium of claim 16, wherein the first RAT comprises long term evolution (LTE) and wherein the second RAT comprises a circuit switched technology.

20. The non-transitory, computer accessible memory medium of claim 16, wherein the second RAT comprises global system for mobile communications (GSM).

* * * * *